Patented Dec. 5, 1922.

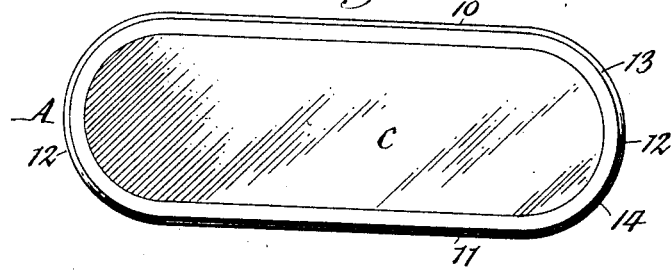
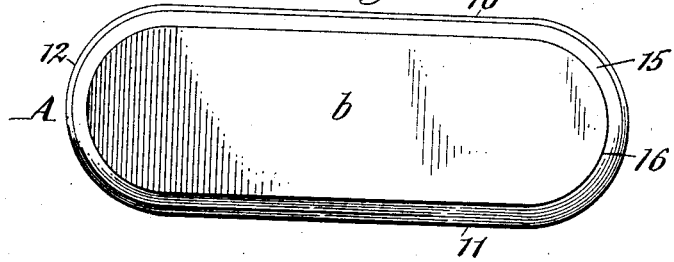
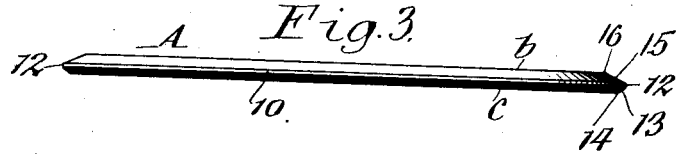
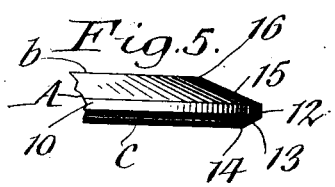
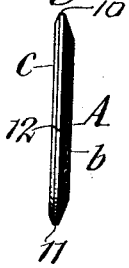

1,437,850

UNITED STATES PATENT OFFICE.

WILLIAM LA HODNY, OF BUFFALO, NEW YORK.

MIRROR.

Original application filed January 24, 1920, Serial No. 353,653. Divided and this application filed October 12, 1920. Serial No. 416,382.

*To all whom it may concern:*

Be it known that I, WILLIAM LA HODNY, a citizen of the United States, residing in Buffalo, in the county of Erie and State of New York, have invented new and useful Improvements in Mirrors, of which the following is a specification.

This invention relates to improvements in mirrors or reflectors which are more particularly designed to be used on automobiles and other vehicles, in a position to enable the driver to readily see vehicles or objects in rear of his vehicle, although the same may also be used for other purposes.

The object of this invention is to provide a mirror or reflector, the edges of which are finished in such a way as to cooperate with the silvering or backing to produce a framed effect without the use of a frame and in which no double images or confusing reflections are shown.

This application is a subdivision of an application for patent filed by myself January 24, 1920, Serial No. 353,653.

In the accompanying drawings:

Figure 1 is a front elevation of a mirror constructed in accordance with this invention. Figure 2 is a rear elevation of the same. Figure 3 is a longitudinal edge view of the mirror. Figure 4 is a transverse edge view of the same. Figure 5 is a fragmentary enlarged view of the mirror or reflector.

Similar characters of reference refer to like parts throughout the several views.

A reflecting device constructed in accordance with one embodiment of the invention is disclosed in the drawings and preferably comprises a mirror the glass or transparent body A of which may be adjustably supported on the front part of a vehicle facing the driver so as to reflect toward him a view of the surroundings at the back of the vehicle, preferably as seen through a rear window of the vehicle, thus indicating the presence and direction of travel of other vehicles.

The body A of the mirror may be of any suitable or desired outline, that shown in the drawings having upper and lower longitudinal parallel side edges 10, 11 and curved or rounded opposite end or transverse edges 12. These edges 10, 11 and 12 are finished in a novel manner to produce a framed effect as follows: The corners formed by the meeting of the front surface of the mirror and the edges 10, 11 and 12 are ground off to form a short bevel 13, the inner edge of which is indicated at 14, while the corners formed by the meeting of the rear surface and the edges of the mirror body are ground off to form a wider border or bevel 15, the inner edge of which is shown at 16. The back surface $b$ of the mirror body is silvered in the usual way to give a reflecting field or surface, but this silvered surface is confined within the edges 16 of the rear bevel 15, and consequently the unsilvered border 15 is transparent and gives the mirror an appearance of being framed when viewed from the front side $c$ of the mirror. Another important result of this construction is that the border 15 is non-reflecting and therefore no confusing or distracting double images are reflected from the mirror when in use.

If desired the wide or rear bevel 15 may be finished in any suitable manner for instance, by grinding the same or smoothening the same to produce a ground glass or dull effect or the same may be painted to produce a non-reflecting border.

I claim as my invention:

1. A mirror having a transparent glass plate body having the corners formed by the meeting of the front surface and the edges thereof provided with a bevel, and the corners formed by the meeting of the rear face and said edges provided with a bevel, and having the rear surface bounded by said rear bevel coated to form the reflecting field of the mirror while the rear bevel around said field is uncoated and forms a transparent non-reflecting border around said reflecting field.

2. A mirror comprising a transparent glass plate body having the corners formed by the meeting of the front surface and the edges thereof provided with a short bevel and the corners formed by the meeting of the rear surface and said edges provided with a wide bevel, and having the rear surface bounded by said wide rear bevel coated to form the reflecting field of the mirror while said wide bevel is uncoated and forms a transparent non-reflecting border around said reflecting field.

WILLIAM LA HODNY.